(12) United States Patent
Chungbin et al.

(10) Patent No.: US 11,772,360 B2
(45) Date of Patent: Oct. 3, 2023

(54) FILAMENT FASTENER THAT CURES WITH COMPOSITE PART

(71) Applicant: The Boeing Company, Chicago, IL (US)

(72) Inventors: Jerry Chungbin, Kenmore, WA (US); Mark Rogalski, Sammamish, WA (US); Everette Gray, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/807,229

(22) Filed: Jun. 16, 2022

(65) Prior Publication Data

US 2022/0305758 A1 Sep. 29, 2022

Related U.S. Application Data

(62) Division of application No. 16/508,144, filed on Jul. 10, 2019, now Pat. No. 11,446,900.

(51) Int. Cl.
*B32B 7/08* (2019.01)
*B29C 70/08* (2006.01)
(Continued)

(52) U.S. Cl.
CPC ............. *B32B 7/08* (2013.01); *B29C 70/08* (2013.01); *B32B 5/22* (2013.01); *B32B 37/18* (2013.01);
(Continued)

(58) Field of Classification Search
CPC ......... B32B 7/08; B32B 5/22; B32B 38/1808; B32B 38/08; B32B 2037/1253;
(Continued)

(56) References Cited

U.S. PATENT DOCUMENTS

2013/0266765 A1 * 10/2013 Dolzinski ............... B29C 66/45
156/92

FOREIGN PATENT DOCUMENTS

DE 202011002397 U1 * 6/2011
KR 10-1663142 B1 * 10/2016

OTHER PUBLICATIONS

Zhang et al., "Experimental Study on the Performance of Twisted Fiber Reinforced Composite Z-Pin", 21st International Conference on Composite Materials, Xi'an, Aug. 20-25, 2017, http://www.iccm-central.org/Proceedings/ICCM21proceedings/papers/4401.pdf. (Year: 2017).*

(Continued)

*Primary Examiner* — Christopher W Raimund
(74) *Attorney, Agent, or Firm* — Duft & Bornsen, PC

(57) ABSTRACT

Systems and methods for filament fastener that cures with composite part. One embodiment is a method of fabricating a composite part. The method includes placing layers of reinforcement fibers over a tool to form a laminate of composite material to be cured with a first resin, forming a filament fastener comprising bundled fibers with one or more texture elements around the bundled fibers, and coating the filament fastener with a second resin that is chemically compatible with the first resin. The method also includes inserting the filament fastener into the laminate through a plurality of the layers, and curing the filament fastener within the laminate to bind the plurality of the layers of the laminate with the one or more texture elements of the filament fastener via bonding of the first resin and the second resin to form the composite part with delamination resistance.

20 Claims, 11 Drawing Sheets

(51) Int. Cl.
  *B32B 5/22*    (2006.01)
  *B32B 38/18*   (2006.01)
  *B32B 38/08*   (2006.01)
  *B32B 37/12*   (2006.01)
  *B32B 38/00*   (2006.01)
  *B32B 37/18*   (2006.01)

(52) U.S. Cl.
  CPC ........... *B32B 38/08* (2013.01); *B32B 38/1808* (2013.01); *B32B 2037/1253* (2013.01); *B32B 2038/008* (2013.01); *B32B 2260/046* (2013.01); *B32B 2305/10* (2013.01)

(58) Field of Classification Search
  CPC .............. B32B 2038/008; B32B 37/18; B32B 2305/10; B32B 2260/046; B29C 70/08; B29C 70/24; B29C 70/34; B29C 70/545
  See application file for complete search history.

(56) References Cited

OTHER PUBLICATIONS

Tan et al., "Failure analysis and strengthening mechanism of Z-pinned composite T-joints under tensile loading", J. Science and Engineering of Composite Materials, vol. 24, No. 5, Apr. 6, 2016. (Year: 2016).*

Tong et al., "3D Fibre Reinforced Polymer Composites", Elsevier Science Ltd., 2002. (Year: 2002).*

Hoffmann et al., "Pullout performance of circumferentially notched z-pins in carbon fiber reinforced laminates", Composites Part A, 110, pp. 197-202, May 2018. (Year: 2018).*

* cited by examiner

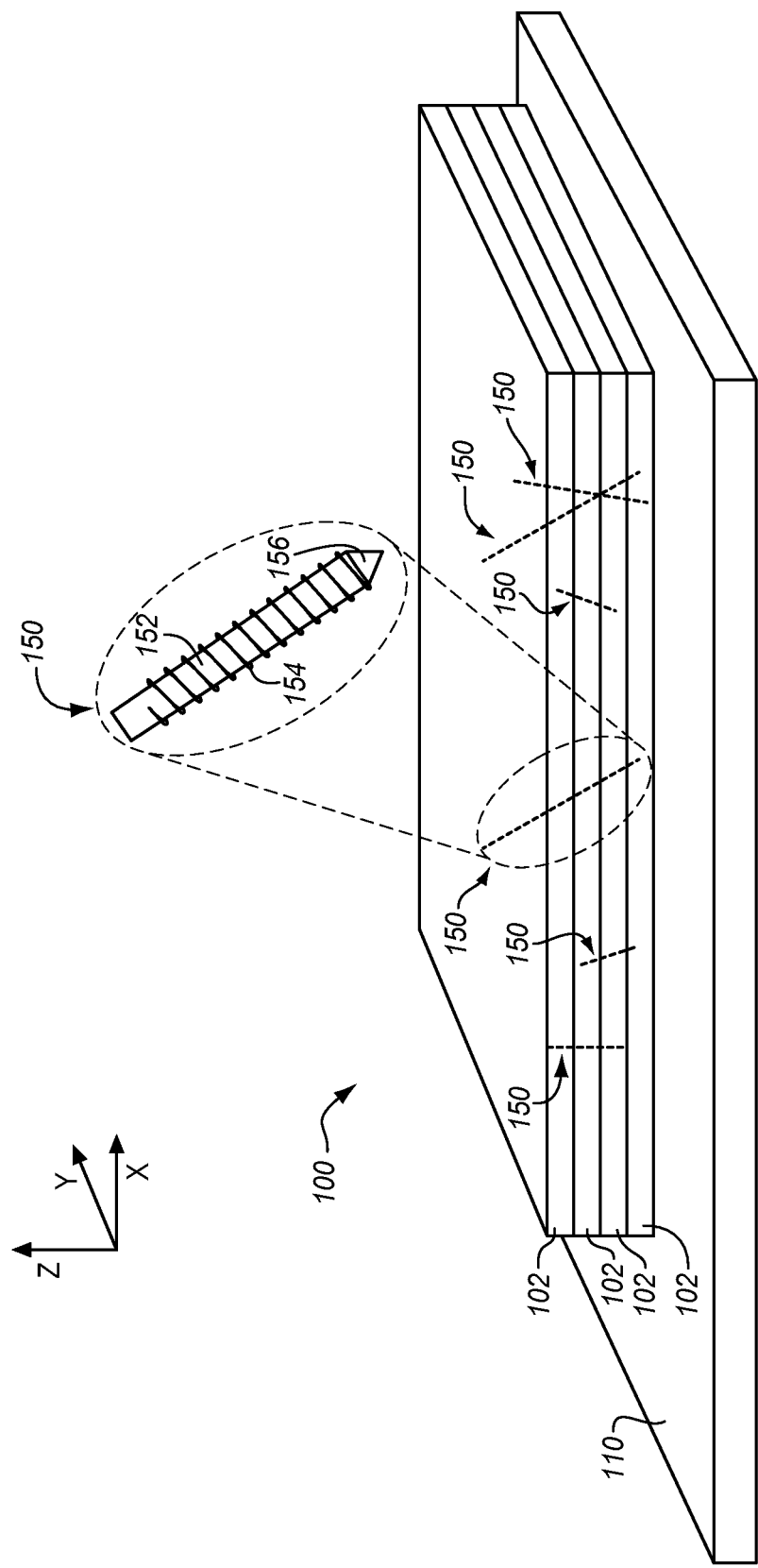

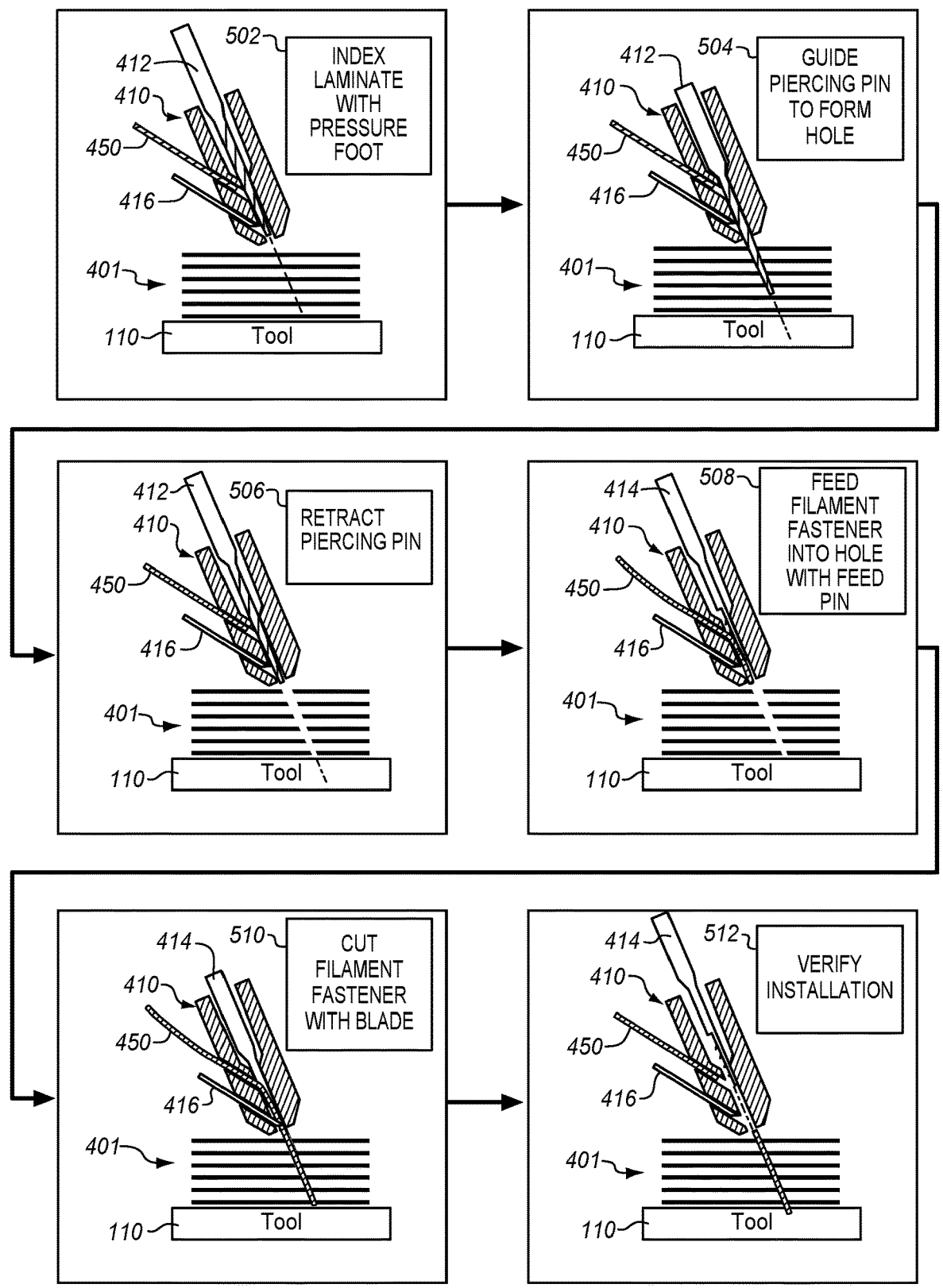

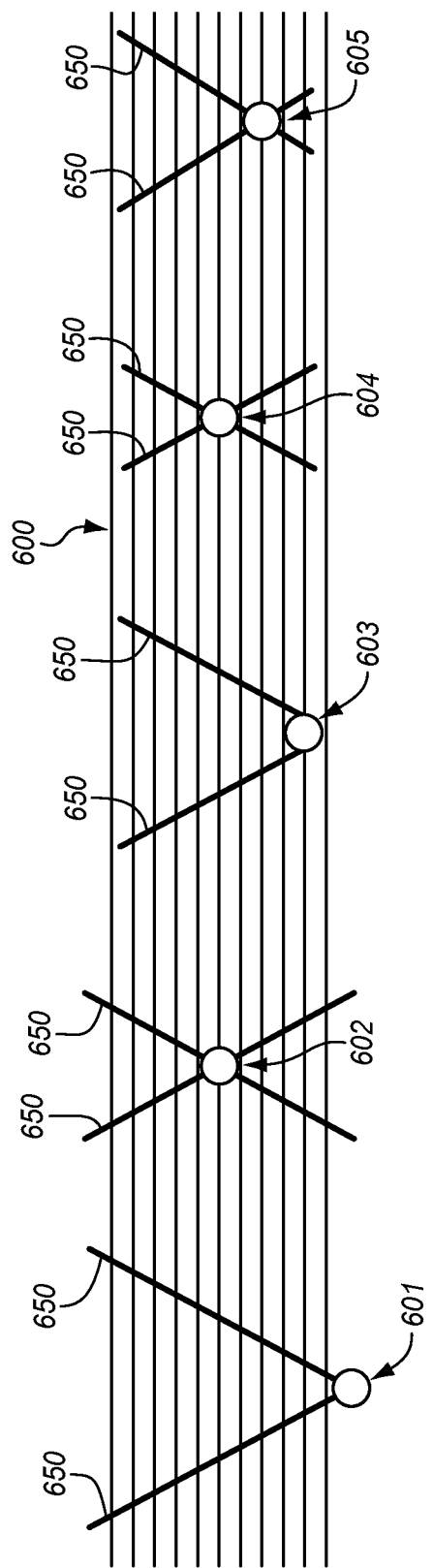

US 11,772,360 B2

FILAMENT FASTENER THAT CURES WITH COMPOSITE PART

FIELD

This disclosure relates to the field of manufacturing, and more particularly, to manufacturing of composite parts. This application is a divisional of application Ser. No. 16/508,144 filed Jul. 10, 2019 (issued on Sep. 20, 2022 as U.S. Pat. No. 11,446900 B2).

BACKGROUND

Composite parts, such as carbon fiber reinforced plastics (CFRP), are widely used in aerospace and other applications because of their favorable strength-to-weight ratio. Composite parts may be fabricated by laying of plies of prepreg or by resin infusion of dry fibers. Compared with traditional metal aircraft parts that are mechanically assembled together, these composite fabrication techniques enable manufacturing large integrated aircraft structures having complex shapes with increased strength, reduced weight, and using fewer mechanical fasteners for assembly.

However, composite parts are susceptible to delamination, where layers of the material or joined components fracture and separate. Therefore, after a composite part is formed it is often fortified with disbond fasteners to prevent delamination. These mechanical fasteners are labor-intensive to install, may cause stress risers and microcracking in the composite material, add significant weight to the aircraft, and increase production build times when factory flow is critical. Accordingly, it is desirable to produce composite structures having sufficient delamination resistance while also having reduced reliance on traditional disbond fasteners.

SUMMARY

Embodiments described herein provide a filament fastener that cures with a composite part. The structure of the filament fastener is a lightweight thread or post having a diameter sufficiently small so as to separate fibers of the part instead of cutting the fibers as it is inserted into an uncured part. Additionally, the filament fastener may include texture around it or twisted to create a screw-like filament to enable higher surface area bonding with the composite resin system of the part such that its removal involves some type of fracture along the texture or filament. After hardening inside the composite part during cure, the filament fastener is integrally formed within the part to prevent cracks and delamination of the part. Compared with traditional disbond fasteners, the filament fastener yields fabrication and assembly savings and provides improved out-of-plane toughness and interlaminar shear strength while reducing the weight of the final part.

One embodiment is a method of fabricating a composite part. The method includes placing layers of reinforcement fibers over a tool to form a laminate of composite material to be cured with a first resin, forming a filament fastener comprising bundled fibers with one or more texture elements around the bundled fibers, and coating the filament fastener with a second resin that is chemically compatible with the first resin. The method also includes inserting the filament fastener into the laminate through a plurality of the layers, and curing the filament fastener within the laminate to bind the plurality of the layers of the laminate with the one or more texture elements of the filament fastener via bonding of the first resin and the second resin to form the composite part with delamination resistance.

Another embodiment is a composite laminate that includes layers of reinforcement fibers forming a stack of composite material to be cured with a first resin, and a filament fastener including bundled fibers with one or more texture elements around the bundled fibers, and a second resin chemically compatible with the first resin that saturates the filament fastener. The filament fastener is configured to insert into the stack through a plurality of the layers of reinforcement fibers, and to cure within the stack to bind the layers of the stack with the one or more texture elements of the filament fastener via bonding of the first resin and the second resin to form the composite laminate with delamination resistance.

Yet another embodiment is an apparatus that includes a filament fastener comprising: a core thread comprising bundled fibers, a texture thread wrapped around the core thread in a spiral, and a resin that saturates the filament fastener and orients the texture thread with respect to the core thread to form the filament fastener in a helical shape. The filament fastener is configured to insert into a composite laminate through one or more layers of reinforcement fibers laid up as a stack of composite material, and to cure within the stack via the resin to bind the layers with the texture thread of the filament fastener.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIG. 1 shows a composite laminate in an illustrative embodiment.

FIG. 5 is a flow diagram of using the filament fastener insertion system to install a filament fastener in an illustrative embodiment.

FIG. 6 is a side view of a composite part including angled filament fasteners in an illustrative embodiment.

DETAILED DESCRIPTION

Figure 2A:
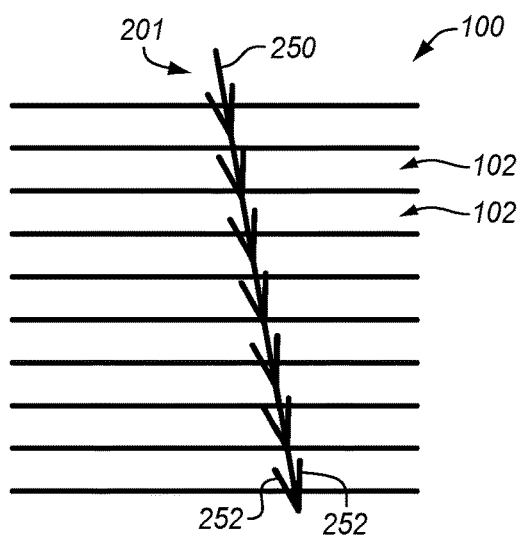
FIGS. 2A-2C are side views of various types of filament fasteners inserted into a laminate in illustrative embodiments.

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

FIG. 1 shows a laminate 100 for forming a composite part in an illustrative embodiment. The laminate 100 comprises layers 102 of reinforcement fibers (also referred to as plies) that are laid-up on a tool 110 (also referred to as a molding tool). Generally, each layer 102 comprises a fabric made from any desired fibers, such as carbon, glass, aluminum, steel, titanium, etc. The fabric may be unidirectional, woven, braided, non-crimp, etc. For example, fibers within each layer 102 of the laminate 100 may be aligned parallel with each other, but different layers 102 may exhibit different fiber orientations to increase the strength of the resulting composite along different dimensions.

The layers 102 are cut to size, stacked one on top of another, and transferred to the tool 110. Each of these steps may be performed manually or automatically by fabrication machines. The tool 110 is configured to shape the laminate 100 according to the desired shape of the final composite part. The tool 110 may include multiple forming surfaces and/or contoured surfaces to form composite parts having complex shapes. A composite part may comprise one or more composite elements to form a structure.

The laminate 100 includes a resin, such as a thermoset or thermoplastic resin, that solidifies to harden the laminate 100 into a composite part (e.g., for use in an aircraft). For thermoset resins, curing is a one-way process that permanently hardens the laminate 100 into a composite part. Thermoplastic resins, on the other hand, may return to a viscous form if re-heated. Thus, the resin may include a polyimide, an epoxy, a thermoplastic resin, or any other resin suitable for making composite parts. In some embodiments, the laminate 100 has been impregnated with an uncured resin to form what is referred to as a prepreg. Alternatively, the laminate 100 may include what is referred to as dry fiber or a preform which has not been impregnated with resin but is instead infused with resin prior to curing.

The cure process includes applying heat and/or pressure to the laminate 100 to bond the resin permeating the layers 102 and harden the matrix composite material into a solid structure. After cure, the composite structure may be removed from its mold, cut, trimmed, or otherwise finished as desired to provide the final composite part. Unfortunately, the composite part may be susceptible to delamination where layers of the material fracture and separate. Current techniques for preventing delamination often involve installing disbond fasteners (e.g., bolts) after the composite part is formed. This involves drilling holes in the hardened structure which may potentially weaken the structure. Additionally, as described above, the disbond fasteners are labor-intensive to install and add significant weight to the part which may be undesirable for some applications such as the manufacture of aircraft parts. Moreover, disbond features on parts may not be fasteners but additional material may be applied to mitigate any disbond by load redistribution within a part or laminate or as a restraint. These types of features typically add weight and flow time.

To address these issues, the laminate 100 is enhanced with filament fasteners 150 that are embedded in the laminate 100 prior to cure to prevent post-cure delamination. The filament fasteners 150 generally comprise longitudinal members that are inserted through one or more layers 102 while the laminate 100 is in an uncured state. For example, if layers 102 are arranged along x-y planes, filament fasteners 150 may traverse two or more layers 102 in a z-direction. Each filament fastener 150 includes bundled fibers 152 forming a longitudinal body or thread member, and one or more texture elements 154 around the bundled fibers 152. The filament fastener 150 may also include a tip 156 to facilitate insertion of the filament fastener into the laminate 100. The texture element 154 of the filament fastener 150 provides increased surface area that promotes bonding of the filament fastener 150 with the composite matrix material inside the laminate 100. The bonded surface area of the texture element 154 advantageously provides friction along an axis of the filament fastener 150 after it is hardened within the laminate 100, thereby preventing delamination after the laminate 100 is cured.

Figure 2B:
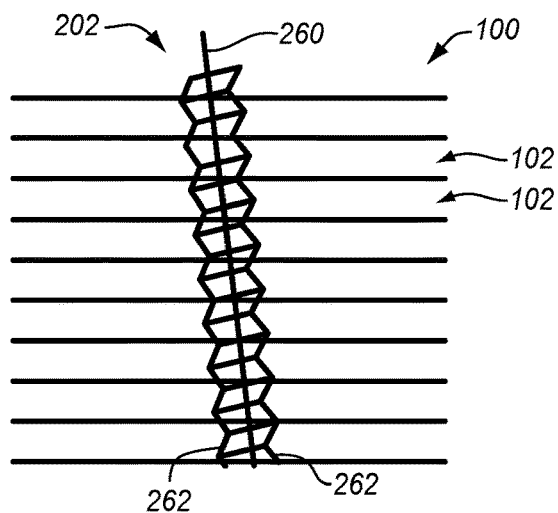
Figure 2C:
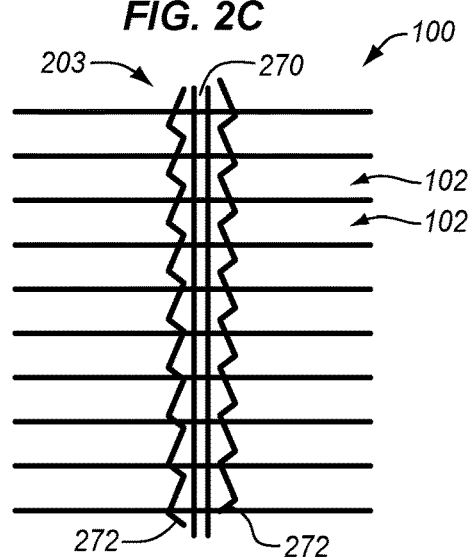

FIGS. 2A-2C are side views of various types of filament fasteners 201-203 inserted into the laminate 100 in illustrative embodiments. In the embodiment shown in FIG. 2A, the filament fastener 201 includes a non-rigid core thread 250 of bundled fibers with fuzzy texture 252 around the non-rigid core thread 250. The fuzzy texture 252 may include fibrous material forming soft barbs or feathers that provide surface for bonding along a length of the filament fastener 201. The fuzzy texture 252 may be formed via abrasion of outer fibers of the filament fastener 201 or may be spun in. Alternatively or additionally, the fuzzy texture 252 may comprise chopped fibers extending radially from the non-rigid core thread 250.

In the embodiment shown in FIG. 2B, the filament fastener 202 includes a non-rigid core thread 260 of bundled fibers with ring texture 262 around the non-rigid core thread 260. The ring texture 262 may comprise annular rings molded to the non-rigid core thread 250 and arranged along a length of the filament fastener 202 to provide surface area (e.g., in the x-y plane) for bonding. Alternatively, the ring texture 262 may comprise a spiral that forms a helical shape around the non-rigid core thread 250 similar to screw threads to provide bonding surface area. The ring texture 262 may be oriented on the non-rigid core thread 260 via a resin. Filament fasteners 201-202 may be spooled as a continuous thread that is inserted into the laminate 100 and cut or that is stitched into the laminate 100.

In the embodiment shown in FIG. 2C, the filament fastener 203 includes a rigid core thread 270 of bundled fibers with spiral texture 272 around the rigid core thread 270. The rigid core thread 270 may comprise a composite/plastic pin or a metal pin that forms a central spike. The spiral texture 272 may form a helical shape around the rigid core thread 270 similar to screw threads to provide bonding surface area. The spiral texture 272 may be molded to the rigid core thread 270 via a resin. That is, the resin may maintain an orientation of various types of texture with respect to the filament fastener. Alternatively or additionally, the core of the filament fastener 201-203 may be formed directly into a helical shape. Thus, the filament fastener 203 may comprise a straight and/or helical shaped javelin to be inserted into the laminate 100. The filament fastener 203 may thus comprise a bundle of fibers and resin configured as a screw such that no fibers or minimal fibers are broken in its construction. This may be accomplished by twisting a threaded mandrel around an extruded rod of fiber and resin at a temperature where forming may take place. For embodiments in which the resin is not the same as the base laminate, the filament fastener may include a thermoplastic that is miscible when cured such that toughness is imparted in the area of insertion. In some embodiments, the rigid core may be removed such that only the helical element remains in the laminate(s).

Generally, filament fasteners 201-203 may each include a diameter that is sufficiently small so as to separate fibers of the laminate 100 instead of cutting the fibers as they are inserted. In one embodiment, the diameter of a filament fastener is less than 0.063 inches. In some embodiments, the filament fastener and the laminate comprise a common composite material, and a co-curing process integrally embeds the filament fastener in the laminate to form a monolithic composite structure. Additionally, in some embodiments, filament fasteners 201-203 may be spun around themselves to form texture structure. In further embodiments, the filament fasteners 201-203 included continuous fibers or fibers with an aspect ratio to transfer load along the length of the filament to cause fracture at some point. For embodiments for which the filament fastener is rigid or semi-rigid, the filament fastener may be configured to withstand insertion into an uncured laminate itself or with the aid of piercing or tapping tool which does not fracture the base laminate. Additionally, rigid or semi-rigid filament fasteners may be spooled or segmented prior to insertion as desired. For filament fasteners having screw or helical type texture, the pitch of the filament fastener may match the thickness of the laminate such that when inserted it imparts minimal out of plane ply distortion. Insertion techniques for various types of filament fasteners are described in greater detail below.

Figure 3:
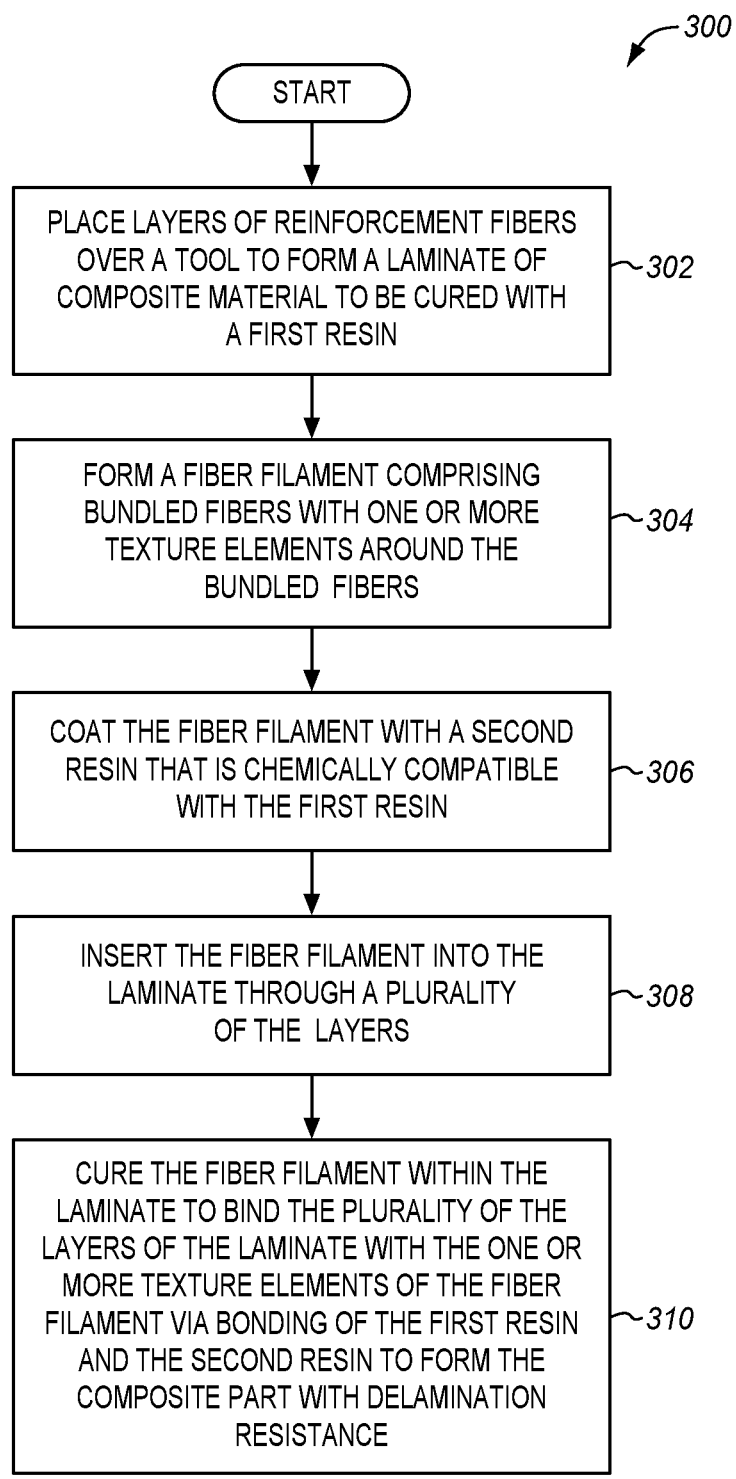
FIG. 3 is a flowchart illustrating a method of fabricating a composite part in an illustrative embodiment.

FIG. 3 is a flowchart illustrating a method 300 of fabricating a composite part in an illustrative embodiment. The steps of method 300 will be described with respect to the laminate 100 and filament fasteners 150 of FIG. 1, although one skilled in the art will understand that the methods described herein may be performed with alternative laminates and filament fasteners. The steps of the methods described herein are not all inclusive and may include other steps not shown. The steps for the flow charts shown herein may also be performed in an alternative order.

In step 302, layers 102 of reinforcement fibers are placed over the tool 110 to form the laminate 100 of composite material to be cured with a first resin. In step 304, a filament fastener 150 is formed comprising bundled fibers 152 with one or more texture elements 154 around the bundled fibers 152. In step 306, the filament fastener 150 is coated with a second resin that is chemically compatible with the first resin. The resins are considered chemically compatible if crosslinking occurs during cure. Alternatively or additionally, the filament fastener 150 may be coated with the same resin or a common resin material to be used to cure the laminate 100.

In step 308, the filament fastener 150 is inserted into the laminate 100 through a plurality of the layers 102. In step 310, the filament fastener 150 is cured within the laminate 100 to bind the plurality of the layers 102 of the laminate 100 with the one or more texture elements 154 of the filament fastener 150 via bonding of the first resin and the second resin to form the composite part with delamination resistance. Method 300 provides a benefit over prior techniques by providing delamination resistance and/or crack arrestment to the composite part without the use of traditional disbond fasteners.

Figure 4:
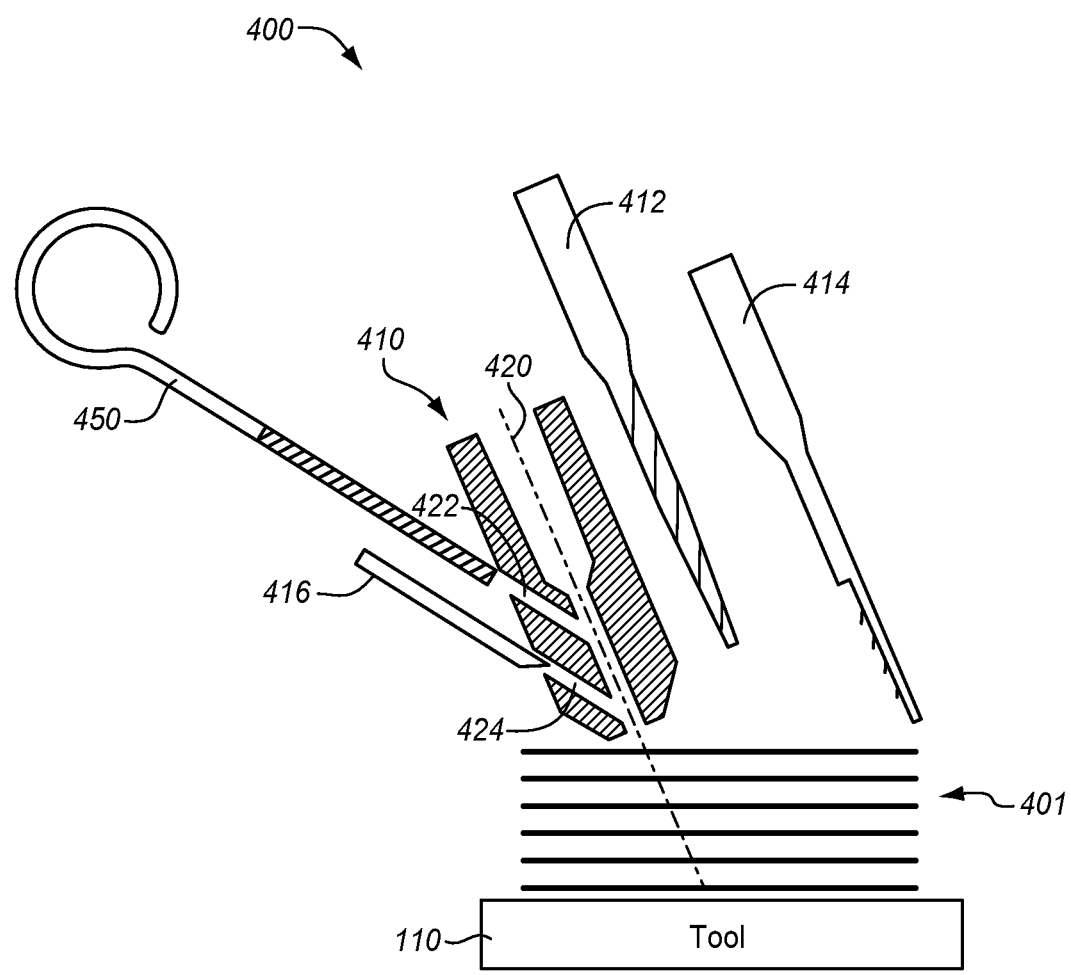
FIG. 4 shows a filament fastener insertion system in an illustrative embodiment.

FIG. 4 shows a filament fastener insertion system 400 in an illustrative embodiment. The filament fastener insertion system 400 is configured to install a soft or non-rigid filament fastener 450 into an uncured laminate 401. The filament fastener insertion system 400 includes a pressure foot 410, a piercing pin 412, a feed pin 414, and a cutting blade 416. The pressure foot 410 includes a feed channel 420, a filament inlet 422, and a blade inlet 424. Details of operation of the filament fastener insertion system 400 are described in greater detail below.

FIG. 5 is a flow diagram 500 of using the filament fastener insertion system 400 to install a filament fastener 450 in an illustrative embodiment. In step 502, the uncured laminate 401 is indexed with the pressure foot 410. The location, depth, and/or angle for installing the filament fastener 450 in the uncured laminate 401 may be determined by a structure analysis of the part including part thickness, resin flow characteristics, and/or material systems. Additionally, the pitch and pattern of installing multiple filament fasteners 450 may vary according to such design space elements.

In step 504, the piercing pin 412 is guided through the pressure foot 410 (e.g., in the feed channel 420) to pierce the uncured laminate 401 and form a hole. The piercing pin 412 may be twisted as it pierces the uncured laminate 401, and held in position for a period of time to allow the uncured laminate 401 to relax and expand from the piercing pin 412. Additionally, the piercing pin 412 may have a diameter sufficiently small so as to pierce the uncured laminate 401 without fracturing its fibers.

In step 506, the piercing pin 412 is retracted from the uncured laminate 401 and slid out of the pressure foot 410. In step 508, the filament fastener 450 is fed through the pressure foot 410 and into the hole using the feed pin 414. The filament fastener 450 enters the filament inlet 422 of the pressure foot 410 and is guided through the feed channel 420 by sliding the feed pin 414 through the feed channel 420 toward the hole. The feed pin 414 may include a barbed nose to grab and feed the filament fastener 450. In some embodiments, the piercing pin 412 enters the uncured laminate 401 with a twist and includes screw-like threads pitched at an angle such that individual plies or layers are not distorted out of plane. The filament fastener 450 may include a similar or corresponding twisted pitch and may be inserted as a screw such that plies/layers are not distorted out of plane and the filament fastener 450 is in direct contact with the uncured laminate 401.

In step 510, the filament fastener 450 is cut with the cutting blade 416. That is, after the filament fastener 450 is pushed by the feed pin 414 to fill the hole, the cutting blade 416 may be inserted through the blade inlet 424 of the pressure foot 410 to cut the filament fastener 450 proximate to a top surface of the uncured laminate 401. In step 512, installation of the filament fastener 450 is verified. The cutting blade 416 and the feed pin 414 may be retracted from the pressure foot 410, and the pressure foot 410 may be indexed to another position to repeat the steps and insert another section of spooled fiber filament material. Accordingly, soft or non-rigid fiber filaments may be embedded into an uncured laminate to prevent delamination.

FIG. 6 is a side view of a composite part 600 including angled filament fasteners in an illustrative embodiment. As shown in FIG. 6, a formed angle between two filament fasteners 650 creates a lock for plies at an apex where the two filament fasteners 650 cross. Additionally, the filament fasteners 650 may embed at various depths of the composite part 600 according to design. For example, a pair of filament fasteners 650 may integrate through a total thickness of the composite part 600 and form a first apex 601 outside the composite part 600 or a second apex 602 inside the composite part 600. Alternatively or additionally, a pair of filament fasteners 650 may integrate through a middle thickness of the composite part and form a third apex 603 inside the composite part 600 near its bottom surface, form a fourth apex 604 at or near mid-thickness, and/or form a fifth apex 605 at a position between mid-thickness and the surface. The filament fasteners 650 may embed in the composite part at any angle including perpendicular or nearly horizontal.

Figure 7A:
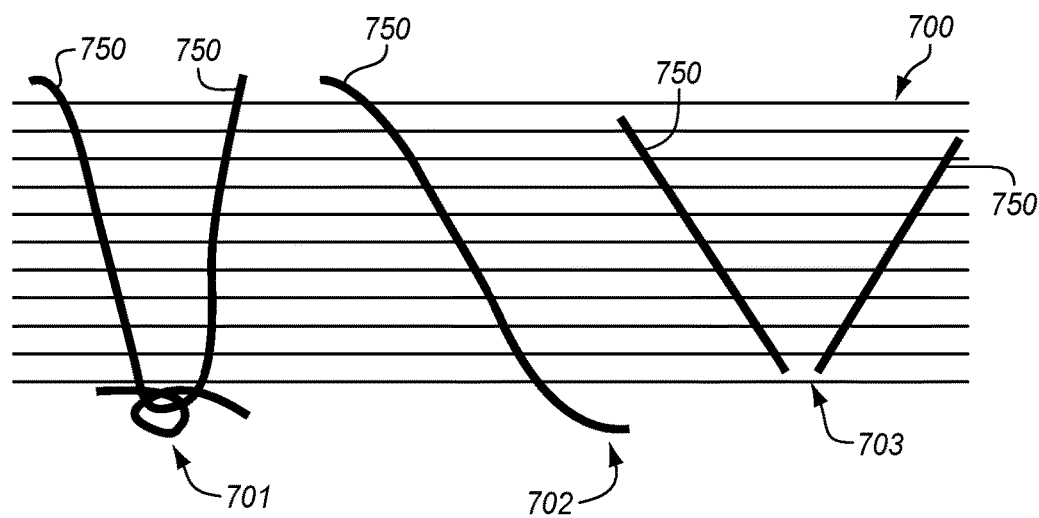
FIG. 7A is a side view of an uncured laminate enhanced with non-rigid filament fasteners in an illustrative embodiment.
Figure 7B:
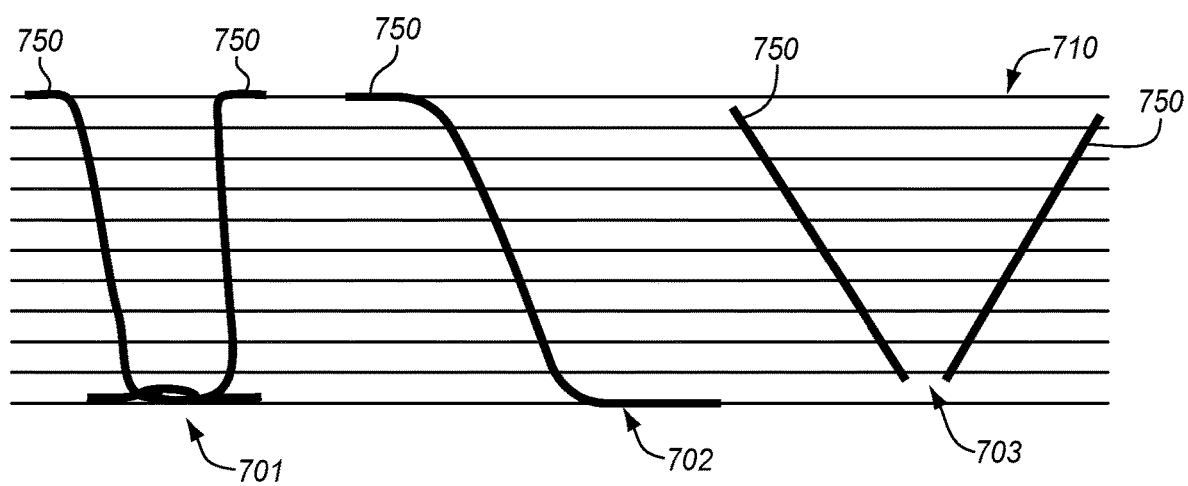
FIG. 7B is a side view of a cured laminate in an illustrative embodiment.

FIG. 7A is a side view of an uncured laminate 700 enhanced with non-rigid filament fasteners 750 in an illustrative embodiment. FIG. 7B is a side view of a cured laminate 710 in an illustrative embodiment. As shown in FIG. 7A, the non-rigid filament fasteners 750 may be sewn 701 with bobbin or chain stitch, pierced through and cut 702, or cut internally 703. The process may include other steps that are performed to prepare for curing of the uncured laminate 700. For example, if the laminate is "dry", then a resin may be infused or impregnated in the laminate, such as with Resin Transfer Molding (RTM), Vacuum-Assisted Resin Transfer Molding (VARTM), etc. The molding tool and layup may also be moved to a curing device at another station. As shown in FIG. 7B, after co-curing with the laminate, the filament fasteners 750 conform to the forming surfaces of the cured laminate 710.

Figure 8A:
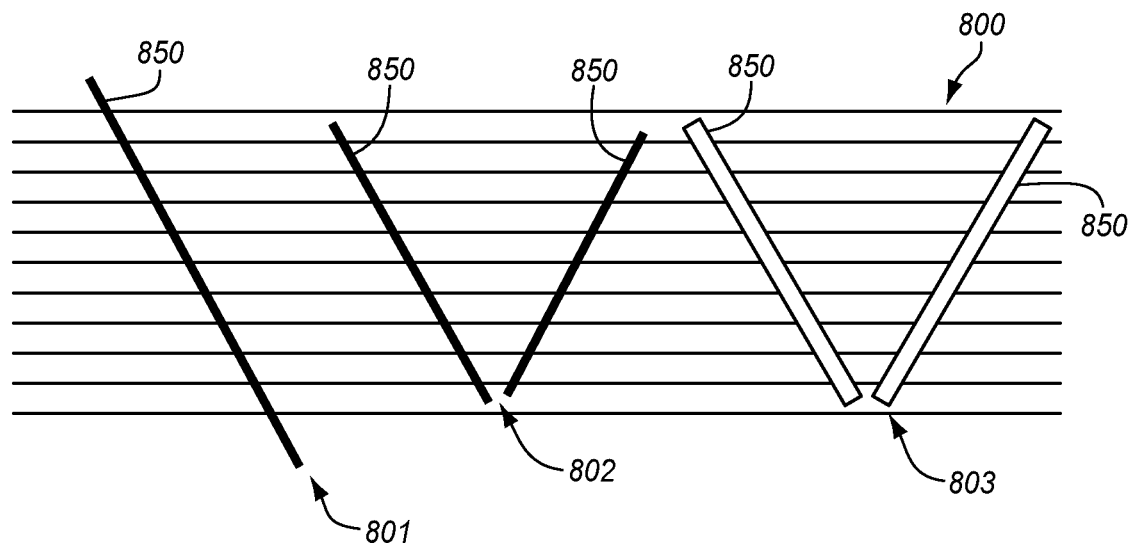
FIG. 8A is a side view of an uncured laminate enhanced with rigid filament fasteners in an illustrative embodiment.
Figure 8B:
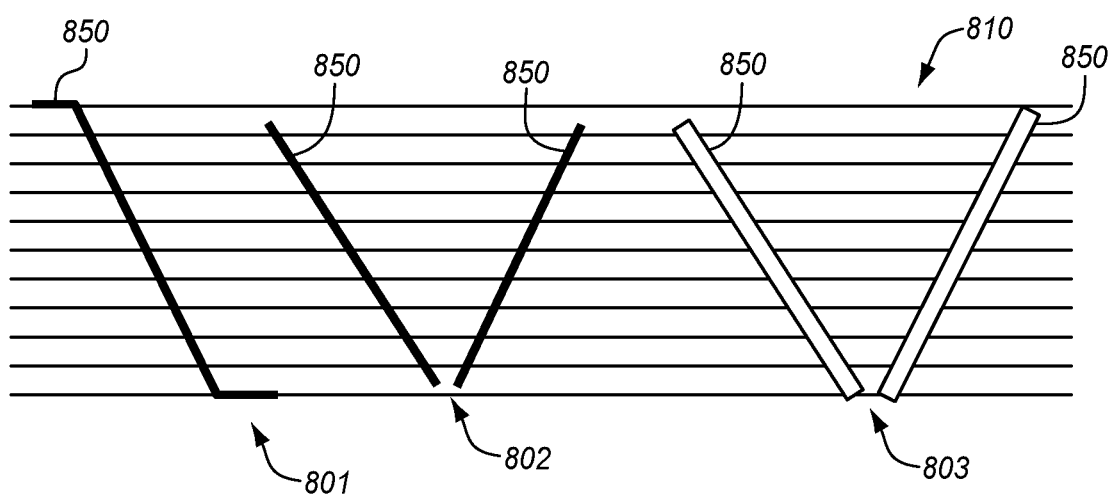
FIG. 8B is a side view of a cured laminate in an illustrative embodiment.

FIG. 8A is a side view of an uncured laminate 800 enhanced with rigid filament fasteners 850 in an illustrative embodiment. FIG. 8B is a side view of a cured laminate 810 in an illustrative embodiment. As shown in FIG. 8A, the rigid filament fasteners 850 may be inserted stiff at installation. The rigid filament fasteners 850 may include a composite material that is pierced through 801 or cut internally 802 to form a monolithic composite structure. Alternatively, the rigid filament fasteners 850 may include a metal material 803 that embeds in the uncured laminate 800. The rigid filament fasteners 850 may be installed from a roll or packaged in a cartridge or band and inserted with a nail gun device. As shown in FIG. 8B, after co-curing with the laminate, the rigid filament fasteners 850 conform to the forming surfaces of the cured laminate 810.

Figure 9:
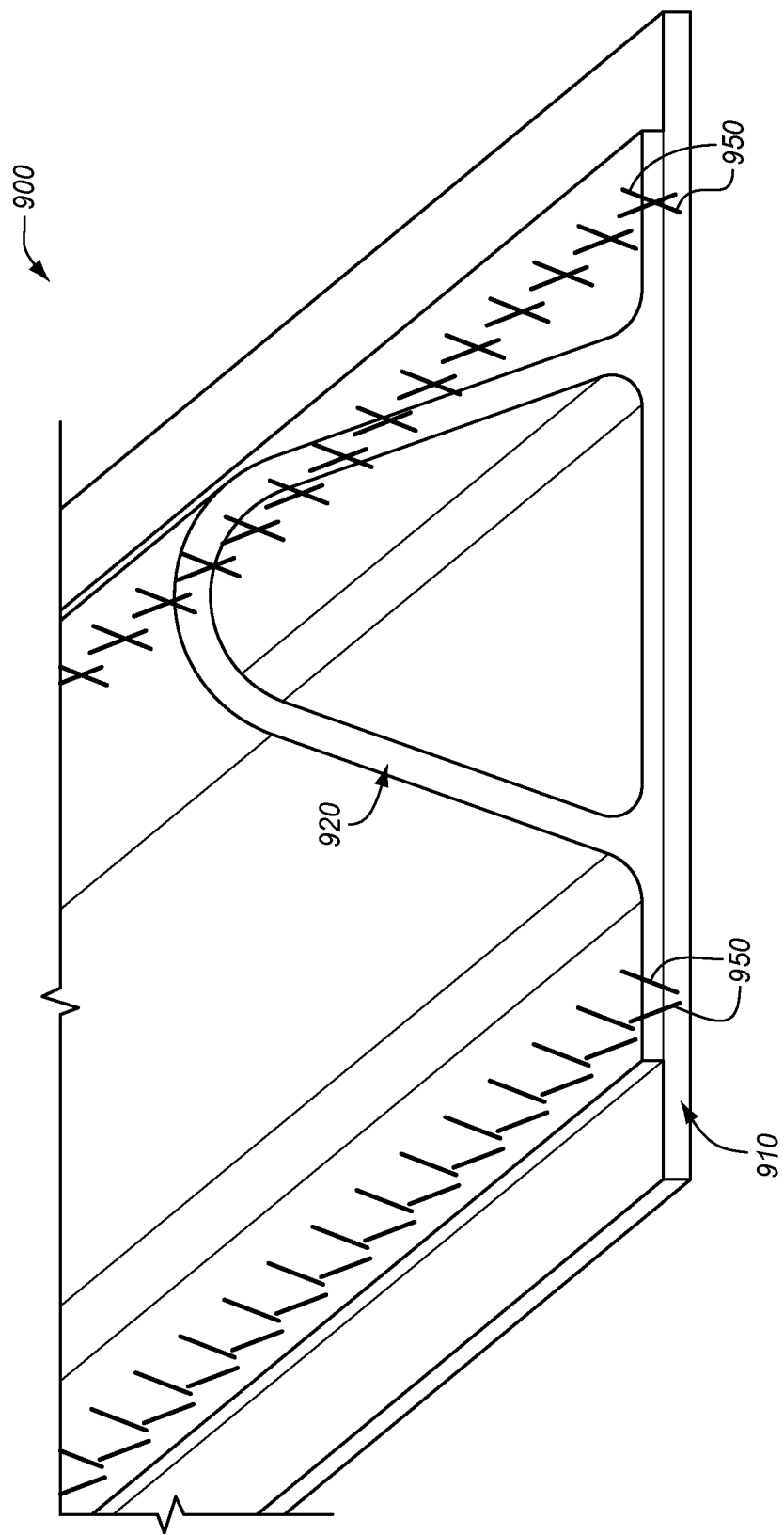
FIG. 9 illustrates a composite part enhanced with filament fasteners in another illustrative embodiment.

FIG. 9 illustrates a composite part 900 enhanced with filament fasteners 950 in another illustrative embodiment. In addition to being consumed within a part to prevent delamination, filament fasteners 950 may be used to integrate multiple parts together to prevent delamination between the parts. In this example, the filament fasteners 950 integrate a skin panel 910 and a stringer 920. Accordingly, filament fasteners 950 may be installed through a layup or stack of multiple parts to be cured together. The filament fasteners 950 may thus join to or more parts, or laminates, together in a co-cure technique to stop disbond where the laminates are joined. Alternatively or additionally, the filament fasteners 950 may be used to improve radius strength or interlaminar tension. If the filament fasteners 950 are used in a single laminate as described above it prevents delamination due to impact. Another example of parts that may be integrated by filament fasteners 950 includes stiffeners and bulkheads.

Figure 10A:
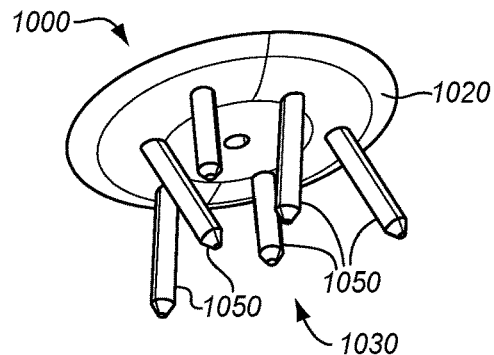
FIG. 10A is a perspective view a joint fastener that includes an array of filament fasteners in an illustrative embodiment.

FIG. 10A is a perspective view a joint fastener 1000 that includes an array of filament fasteners 1050 in an illustrative embodiment. The joint fastener 1000 includes a disc body 1020 and an array 1030 of members extending from a bottom surface of the disc body 1020, wherein each member comprises a filament fastener 1050. The array of members are configured to cure within a composite stack (e.g., wet/dry preform) to bind the layers of the composite material as described in further detail below. Alternatively or additionally, the joint fastener 1000 may be used with an adhesive to fasten parts post-cure.

Figure 10B:
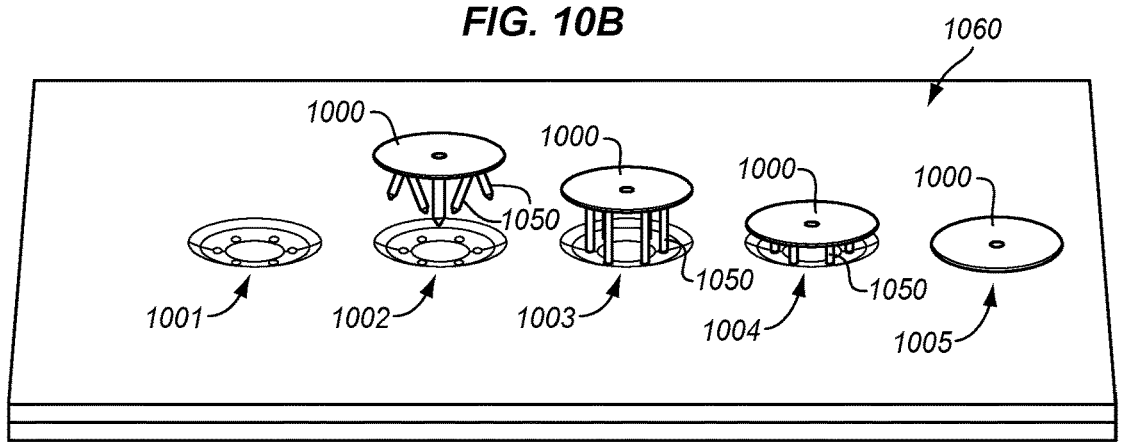
FIG. 10B is a perspective view of a series of steps of installing the joint fastener 1000 with a laminate in an illustrative embodiment.
Figure 10C:
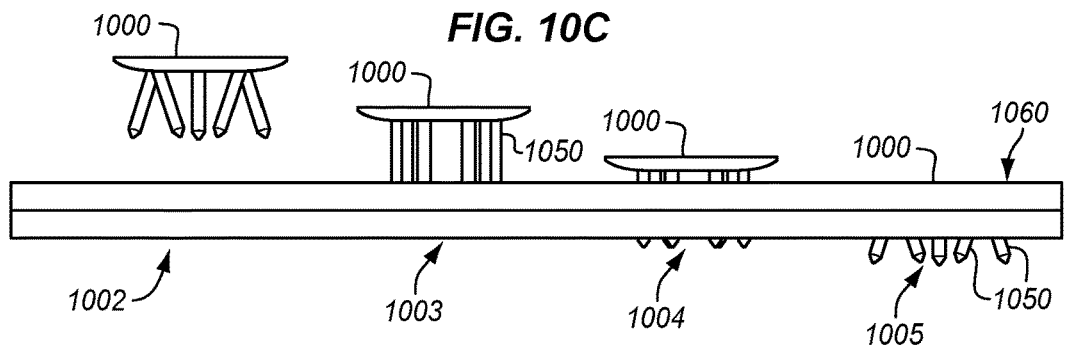
FIG. 10C is a side view of the series of steps of installing the joint fastener with the laminate in an illustrative embodiment.
Figure 10D:
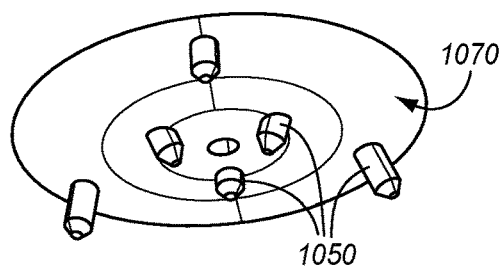
FIG. 10D is a partial bottom view of the joint fastener in an illustrative embodiment.

FIG. 10B is a perspective view of a series of steps of installing the joint fastener 1000 with a laminate 1060 in an illustrative embodiment. FIG. 10C is a side view of the series of steps of installing the joint fastener 1000 with the laminate 1060 in an illustrative embodiment. FIG. 10D is a partial bottom view of the joint fastener in an illustrative embodiment. In step 1001, the laminate 1060 is drilled with crooked holes. In step 1002, the joint fastener 1000 is provided. In step 1003, the filament fasteners 1050 of the joint fastener 1000 are squeezed to a straight position to pilot with the holes. In step 1004, the filament fasteners 1050 are pressed through the crooked holes of the laminate 1060. In step 1005, the disc body 1020 is adhered to the top surface of the laminate 1060 with adhesive. Alternatively or additionally, the joint fastener 1000 is co-cured with the laminate 1060. Alternatively or additionally, a button 1070 is slid over the filament fasteners 1050 at the back side of the laminate 1060.

Figure 11:
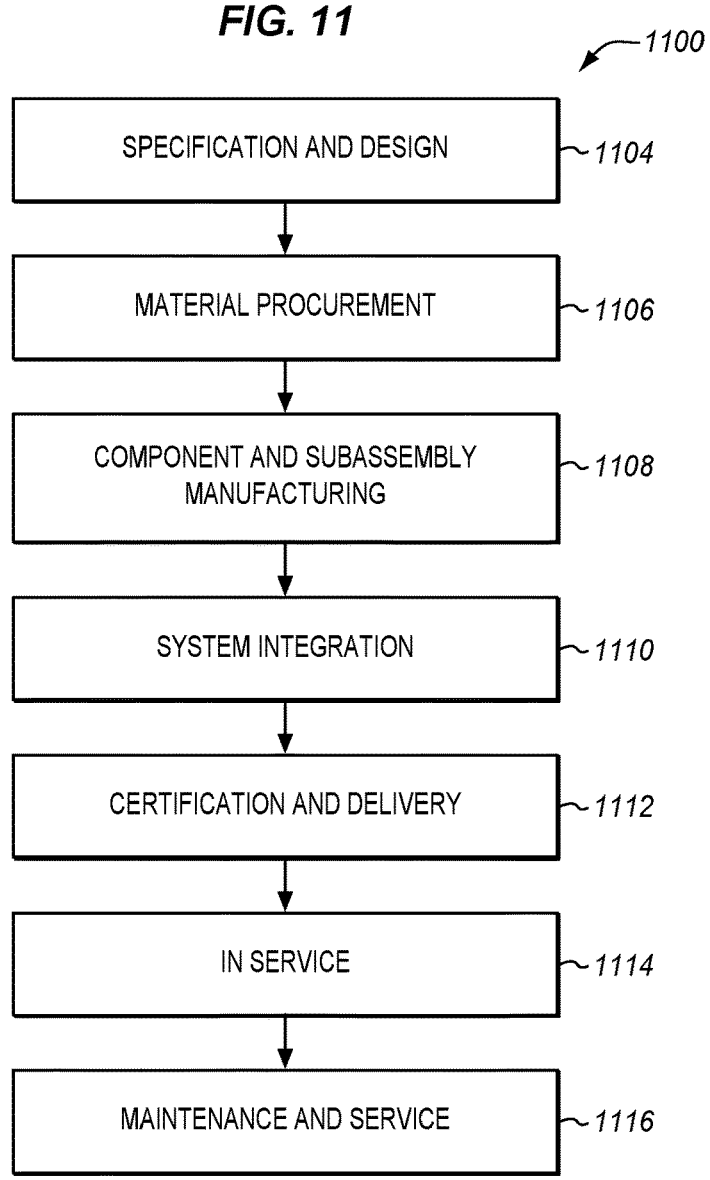
FIG. 11 is a flow chart illustrating an aircraft manufacturing and service method in an illustrative embodiment.
Figure 12:
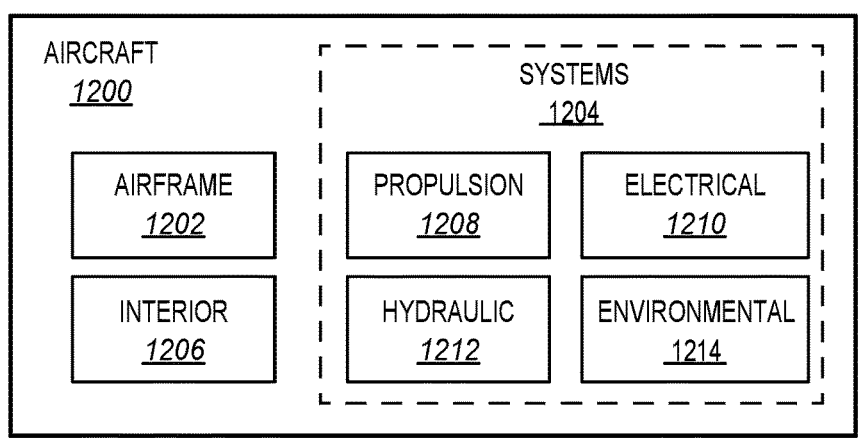
FIG. 12 is a schematic diagram of an aircraft in an illustrative embodiment.

The embodiments of the disclosure may be described in the context of an aircraft manufacturing and service method 1100 as shown in FIG. 11 and an aircraft 1200 as shown in FIG. 12. During pre-production, exemplary method 1100 may include specification and design 1104 of aircraft 1200, and material procurement 1106. During production, component and subassembly manufacturing 1108 and system integration 1110 of aircraft 1200 takes place. Thereafter, aircraft 1200 may go through certification and delivery 1112 in order to be placed in service 1114. While in service by a customer, aircraft 1200 is scheduled for routine maintenance and service 1116 (which may also include modification, reconfiguration, refurbishment, and so on).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, aircraft 1200 produced by exemplary method 1100 may include an airframe 1202 with a plurality of systems 1204 and an interior 1206. Examples of high-level systems 1204 include one or more of a propulsion system 1208, an electrical system 1210, a hydraulic system 1212, and an environmental system 1214. Any number of other systems may be included. Although an aerospace example is shown, the principles described in this specification may be applied to other industries, such as the automotive industry.

Apparatus and methods embodied herein may be employed during any one or more of the stages of the production and service method 1100. For example, components or subassemblies corresponding to production process 1108 may be fabricated or manufactured in a manner similar to components or subassemblies produced while aircraft 1200 is in service. Also, one or more apparatus embodiments, method embodiments, or a combination thereof may be utilized during the production stages 1108 and 1110, for example, by substantially expediting assembly of or reducing the cost of aircraft 1200. Similarly, one or more of apparatus embodiments, method embodiments, or a combination thereof may be utilized while aircraft 1200 is in service, for example and without limitation, to maintenance and service 1116.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A composite laminate comprising:
   layers of reinforcement fibers forming a stack of composite material to be cured with a first resin; and
   a filament fastener including bundled fibers with one or more texture elements around the bundled fibers, and a second resin chemically compatible with the first resin, wherein the one or more texture elements spiral around the bundled fibers to form a helical shape, wherein the helical shape of the filament fastener has a pitch that corresponds with a thickness of each layer of the composite laminate,
   wherein the filament fastener is configured to insert into the stack through a plurality of the layers of reinforcement fibers, and to cure within the stack to bind the layers of the stack with the one or more texture elements of the filament fastener via bonding of the first resin and the second resin to form the composite laminate with delamination resistance.

2. The composite laminate of claim 1 wherein:
   the pitch of the helical shape varies with the thickness of each layer of the composite laminate.

3. The composite laminate of claim 1 wherein:
   the filament fastener is configured to integrate within the stack during the cure to form a monolithic composite structure.

4. The composite laminate of claim 1 wherein:
   the filament fastener includes a tip configured to separate the reinforcement fibers as the filament fastener is inserted through a plurality of plies of the stack of composite material.

5. The composite laminate of claim 1 wherein:
   the first resin and the second resin comprise a common resin material.

6. The composite laminate of claim 1 wherein:
   the stack comprises a prepreg.

7. The composite laminate of claim 1 wherein:
   the stack comprises a preform.

8. The composite laminate of claim 1 wherein:
   the filament fastener comprises a core thread of the bundled fibers wherein the core thread forms a rigid core removable from the helical shape and wherein the helical shape remains within the composite laminate.

9. The composite laminate of claim 8 wherein:
   the one or more texture elements are oriented on the core thread via a resin.

10. The composite laminate of claim 8 wherein:
    the core thread forms a central spike.

11. The composite laminate of claim 1 wherein:
    the filament fastener forms a screw.

12. An apparatus comprising:
    a composite laminate comprising a plurality of layers of reinforcement fibers laid up as a stack of composite material; and
    a filament fastener comprising:
      a core thread comprising bundled fibers;
      a texture thread wrapped around the core thread in a spiral; and
      a resin that orients the texture thread with respect to the core thread to form the filament fastener in a helical shape,
      the filament fastener configured to insert into the composite laminate through one or more layers of the plurality of layers of reinforcement fibers laid up as a stack of composite material, and configured to cure within the stack via the resin to bind the plurality of layers with the texture thread of the filament fastener, wherein the helical shape of the filament fastener has a pitch that corresponds with a thickness of each layer of the composite laminate.

13. The apparatus of claim 12 the filament fastener further comprising:
    a joint fastener:
    a disc body; and
    an array of members extending from a bottom surface of the disc body, each of the members comprising the filament fastener,
    wherein the array of members cure within the stack to bind the layers of the composite material.

14. The apparatus of claim 12 wherein:
    a surface area of the texture thread promotes bonding of the filament fastener to the stack of composite material during the cure to prevent delamination of the composite laminate.

15. The apparatus of claim 12 wherein:
the filament fastener includes a diameter configured to separate fibers of the composite laminate as the filament fastener is inserted into the composite laminate.

16. The apparatus of claim 12 wherein:
the filament fastener is configured to integrate multiple composite laminates.

17. The apparatus of claim 12 wherein:
the filament fastener is configured to integrate within the stack during the cure to form a monolithic composite structure.

18. The apparatus of claim 12 wherein:
the filament fastener is spooled as a continuous thread that is inserted into the composite laminate.

19. The apparatus of claim 12 wherein:
the filament fastener is stitched into the composite laminate.

20. The apparatus of claim 12 wherein:
the pitch of the helical shape varies with the thickness of each layer of the composite laminate.

* * * * *